(12) United States Patent
Busboom

(10) Patent No.: US 6,546,664 B1
(45) Date of Patent: Apr. 15, 2003

(54) SELF-DEPLOYING NET

(76) Inventor: Jeffrey K. Busboom, 89 Pratt Dr., Enterprise, AL (US) 36330

( * ) Notice: Subject to any disclaimer, the term of this patent is extended or adjusted under 35 U.S.C. 154(b) by 0 days.

(21) Appl. No.: 10/045,479

(22) Filed: Nov. 7, 2001

(51) Int. Cl.$^7$ .............................................. A01K 77/00
(52) U.S. Cl. ........................................................ 43/12
(58) Field of Search ........................... 43/7, 11–12, 26; 473/505, 510, 511, 577; D21/589, 692; 42/53–55; 135/19, 5, 20.3, 22–24, 75

(56) References Cited

U.S. PATENT DOCUMENTS

| | | | | |
|---|---|---|---|---|
| 1,258,632 A | * | 3/1918 | Harris | 43/12 |
| 2,617,651 A | * | 11/1952 | Gerhold | 124/16 |
| 2,962,187 A | * | 11/1960 | Morris | 206/315.11 |
| 3,678,611 A | * | 7/1972 | Files | 206/315.11 |
| 3,678,886 A | * | 7/1972 | Tibbet | 116/173 |
| 3,758,218 A | * | 9/1973 | Pfrommer et al. | 401/86 |
| 3,777,428 A | * | 12/1973 | Caufield | 116/63 P |
| 3,815,272 A | | 6/1974 | Marleau | |
| 4,050,177 A | | 9/1977 | Gerritsen | |
| 4,138,790 A | | 2/1979 | Schmucker | |
| 4,139,961 A | * | 2/1979 | Markos | 43/12 |
| 4,492,052 A | | 1/1985 | Davis | |
| 4,574,513 A | | 3/1986 | Wearing | |
| 4,706,404 A | | 11/1987 | Kun | |
| 4,870,773 A | | 10/1989 | Schmucker et al. | |
| 5,065,904 A | * | 11/1991 | McCaffrey et al. | 135/19.5 |
| 5,276,989 A | | 1/1994 | Lumb et al. | |
| 5,309,933 A | * | 5/1994 | Nagai et al. | 135/24 |
| 5,343,825 A | * | 9/1994 | Gazecimeon et al. | 116/173 |
| 5,458,144 A | * | 10/1995 | Lavine | 135/24 |
| 5,533,293 A | | 7/1996 | Boehm | |
| 5,581,929 A | | 12/1996 | Molloy | |
| 5,605,003 A | | 2/1997 | Krc et al. | |
| 5,706,795 A | * | 1/1998 | Gerwig | 124/71 |
| 5,822,908 A | | 10/1998 | Blanchard | |
| 6,003,262 A | * | 12/1999 | Beaty | 43/12 |
| 6,058,642 A | * | 5/2000 | Branneman | 43/12 |
| 6,178,684 B1 | | 1/2001 | Nyakas et al. | |
| 6,260,302 B1 | | 7/2001 | Blaschke | |

* cited by examiner

Primary Examiner—Charles T. Jordon
Assistant Examiner—Bret Hayes
(74) Attorney, Agent, or Firm—Myers & Kaplan, Intellectual Property Law, L.L.C.; Joel D. Myers

(57) ABSTRACT

A self-deploying net, wherein depression of a locking mechanism springfully urges a net from out a compact, portable housing, thus minimizing overall deployment time, eliminating lengthy net assembly processes and enabling single handed net deployment.

21 Claims, 5 Drawing Sheets

SELF-DEPLOYING NET

TECHNICAL FIELD

The present invention relates generally to nets, and more specifically to a self-deploying net. The present invention is particularly useful during, although not limited to, fishing expeditions, wherein conveniently portable, quickly accessible fish landing gear is desired.

BACKGROUND OF THE INVENTION

Of ten times, individuals engaged in activities such as sport fishing or entomological studies employ the use of nets to seize and retain their catch. Although it is preferred that nets utilized in such hobbies or endeavors be easily and quickly deployed, most nets for such activities are disadvantageously large and bulky, making their use cumbersome and awkward. Moreover, although collapsible or foldable nets are available and utilized for their portability, such nets generally require manual extension and/or assembly before use, further complicating the process of their deployment and adding to their impracticality in situations requiring quick accessibility to a net.

For instance, U.S. Pat. No. 5,581,929 to Molley discloses a net deployable by manually extending a slidable collar through the length of a tubular shaft handle, wherein a net support attached to the collar is extended and divergently opened upon such sliding movement of the collar up the shaft handle. The Molly fishing net inherently requires the use of more than one hand for deployment of the net.

Additionally, U.S. Pat. No. 3,815,272 to Marleau discloses a collapsible three-sided fishing net requiring the manual assembly of three arms to form a fish net frame. Specifically, a first arm is in communication with a second arm and is further hingably attached to a third arm, wherein the third arm possesses a collar that slidably engages the second arm. Manual movement of the collar through the length of the second arm forms the triangular fish net frame. As such, Marleau also requires manual extension and assembly and the use of more than one hand for deployment.

U.S. Pat. No. 6,178,684 B1 to Nyakas et al. discloses a collapsible fishing net mechanism, wherein two net frame arms are hingably connected to a handle via a coupler and require manual bending and manipulation to connect together, thereby forming a circualar fishing net. The Nyakas et al. device consequently also requires manual assembly and deployment via the use of more than one hand.

Therefore, it is readily apparent that there is a need for a self-deploying net, wherein a net carried within a compact, portable housing is quickly and springfully deployed therefrom via the simple simultaneous depression of a release button and a safety button.

BRIEF SUMMARY OF THE INVENTION

Briefly described, in a preferred embodiment, the present invention overcomes the above-mentioned disadvantages, and meets the recognized need for such a device by providing a self-deploying net, wherein depression of a release button and a safety button springfully urges a net to extend from the interior of a portable compact housing, thus minimizing overall deployment time and eliminating manual net assembly by enabling quick, single-handed net deployment.

According to its major aspects and broadly stated, the present invention in its preferred form is a self-deploying net having support arms, a mesh net, a curved spring for urging the support arms open, a tension spring for deploying the support arms, a locking mechanism, a plunger, an air cell and a housing.

More specifically, the present invention is a self-deploying net having two support arms supporting a mesh net, wherein a curved spring carried by a plunger resiliently holds the support arms. The plunger, also referred to herein as a shuttle or transport, further has a locking mechanism defined by a release button and a safety button, wherein the release button and safety button extend from the plunger and to the exterior of the housing via throughholes, thus preventing longitudinal movement of the plunger through the housing. Furthermore, positioned within the housing and held in a compressed position by the plunger is a tension spring. Simultaneous depression of the release and safety buttons unlock the plunger from its place, resulting in the extension of the tension spring and the springfully urging of the plunger through the length of the housing, thus ejecting the support arms and accompanying net from the housing. Upon exiting the housing, the curved spring urges the support arms into a V-formation, automatically assembling the net. Moreover, an air cell incorporated into the design of the housing enables the device to stay afloat should it be exposed to a body of water.

A feature and advantage of the present invention is its ability to provide a compact, self-assembling net that is deployed upon simple depression of a dual button control.

A feature and advantage of the present invention is its ability to be held and deployed utilizing only one hand, thus freeing the other hand for a different and separate task.

A feature and advantage of the present invention is its ability to stay afloat in a body of water via an incorporated air cell.

A feature and advantage of the present invention is its portability.

A feature and advantage of the present invention is its ease of use.

A feature and advantage of the present invention is its ability to be utilized for most any activity requiring a net.

A feature and advantage of the present invention is its ability to self-deploy without the use of hinges.

A feature and advantage of the present invention is its ability to assemble and self-deploy without requiring manual assembly.

A feature, and advantage of the present invention is its ability to be easily returned to or recessed within the confines of the housing for portability and/or subsequent use.

A feature and advantage of the present invention is the use of a dual-button control having a release button coupled to a safety button, wherein simultaneous depression of the two buttons is required to deploy the net, and wherein depression of either the release button or the safety button alone will preclude deployment of the net.

These and other objects, features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATIVE EMBODIMENTS

Figure 1:
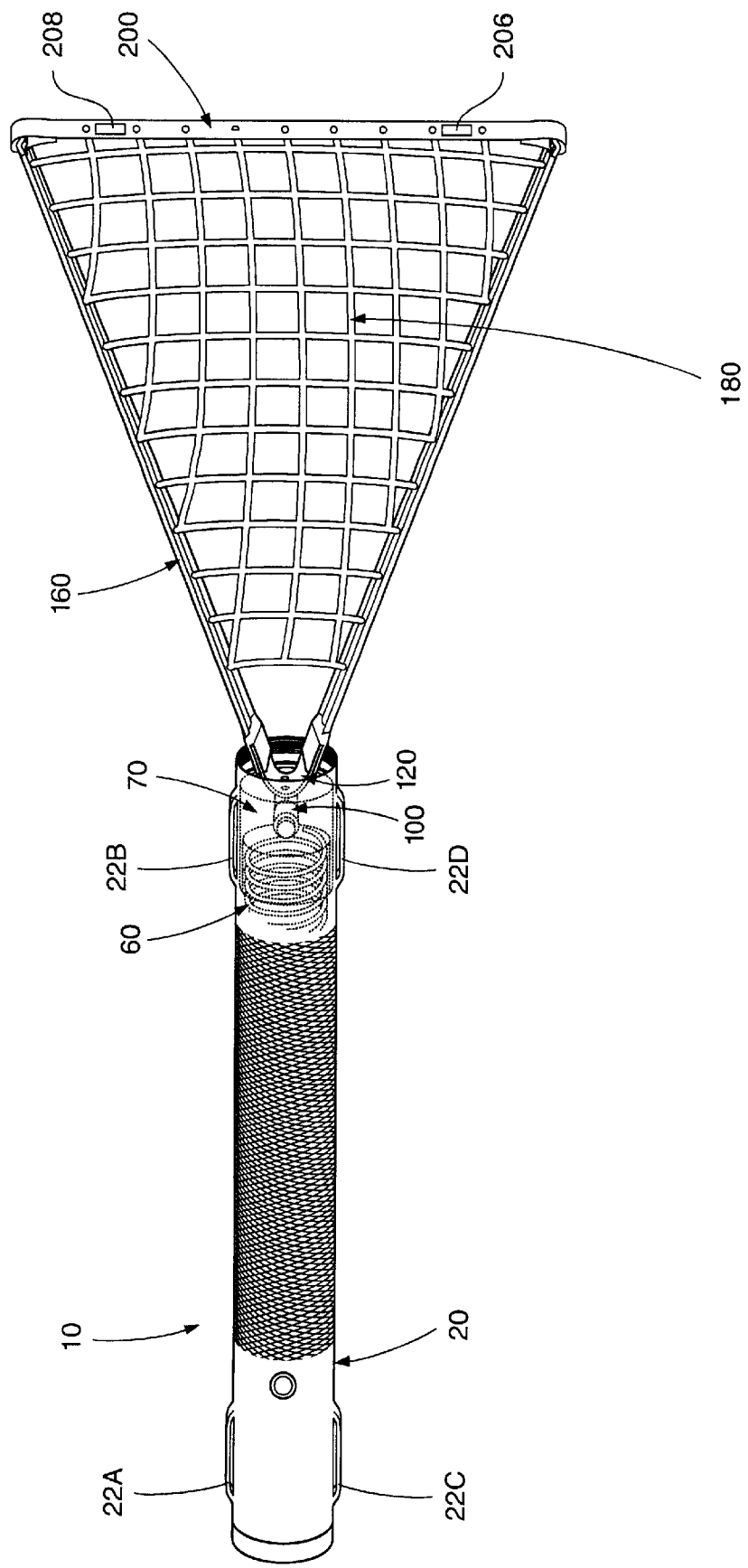
FIG. 1 is a perspective view of a self-deploying net according to a preferred embodiment of the present invention showing the device in a deployed position.
Figure 2:
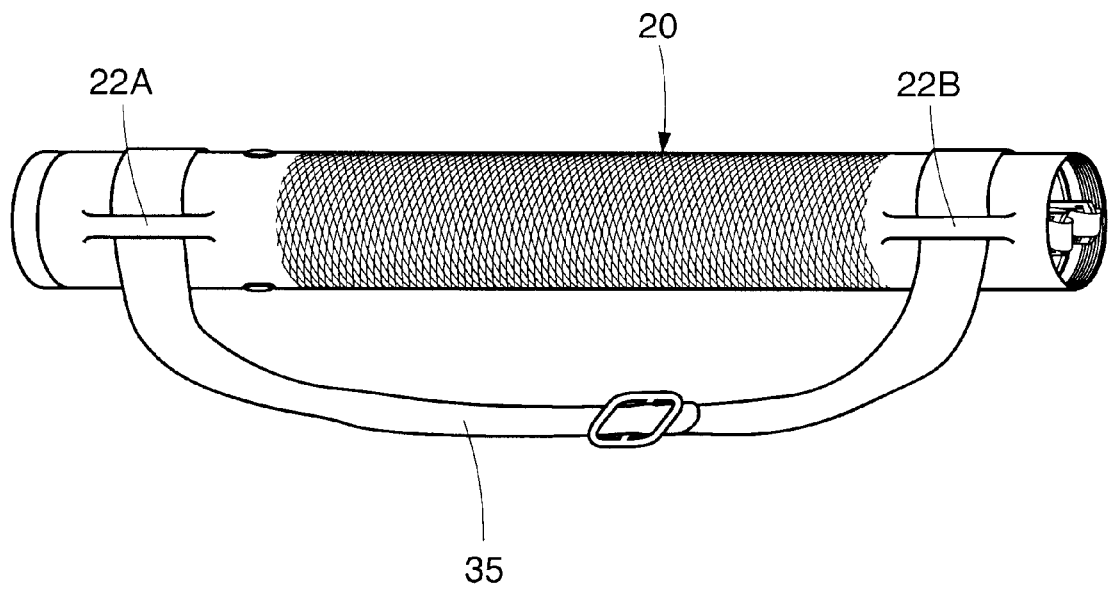
FIG. 2 is a perspective view of a self-deploying net according to a preferred embodiment of the present invention showing the device in a non-deployed position.

In describing the preferred and alternate embodiments of the present invention, as illustrated in FIGS. 1–5, specific terminology is employed for the sake of clarity. The invention, however, is not intended to be limited to the specific terminology so selected, and it is to be understood that each specific element includes all technical equivalents that operate in a similar manner to accomplish similar functions Referring now to FIGS. 1–5, the present invention in its preferred embodiment is a device 10, wherein device 10 is a self-deploying net generally comprising a housing 20, a tension spring 60, a plunger 70, a locking mechanism 100, a curved spring 120, support arms 140 and 160, a net 180 and a net strap 200.

Figure 3:
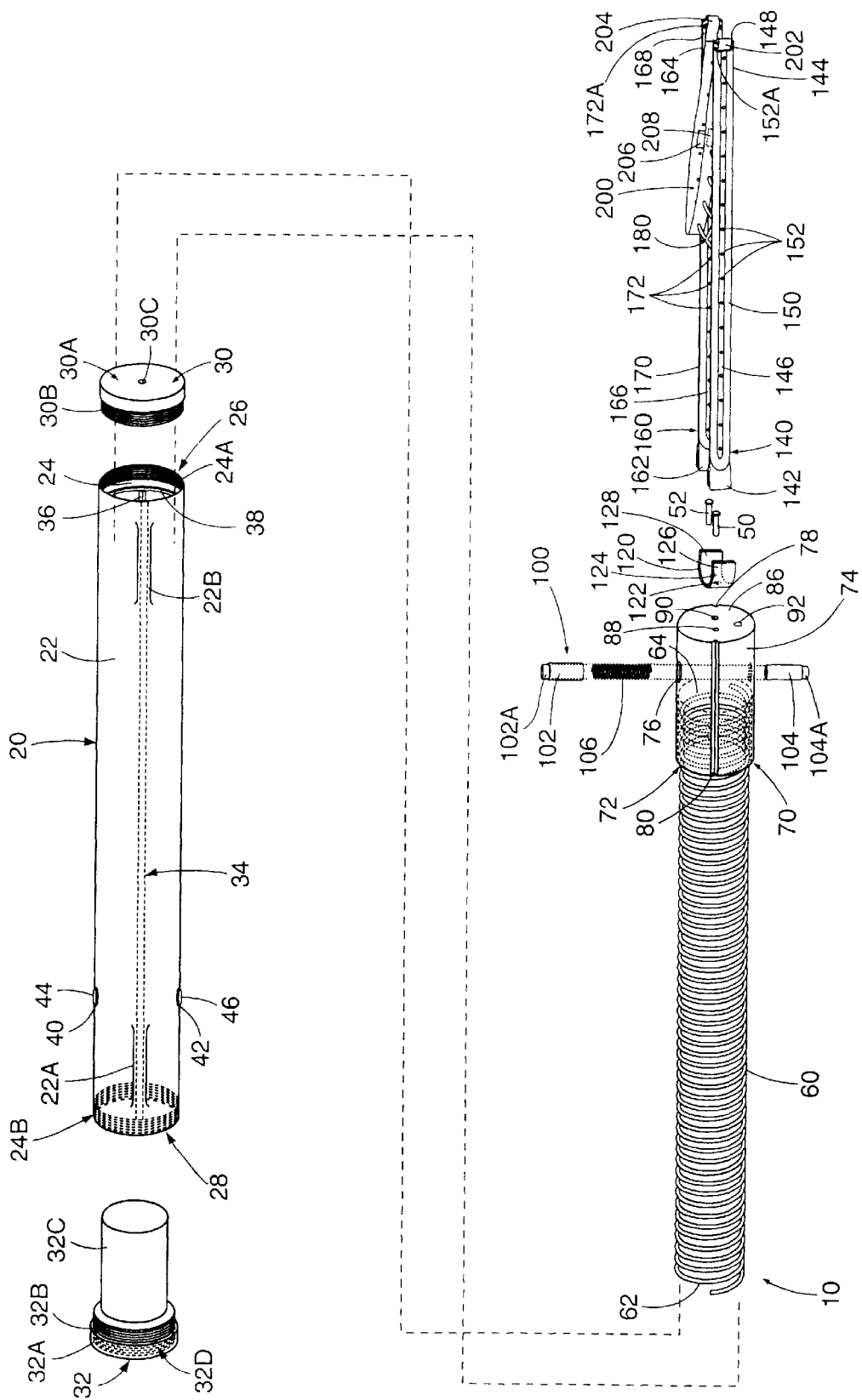
FIG. 3 is an exploded view of a self-deploying net according to a preferred embodiment of the present invention.
Figure 4:
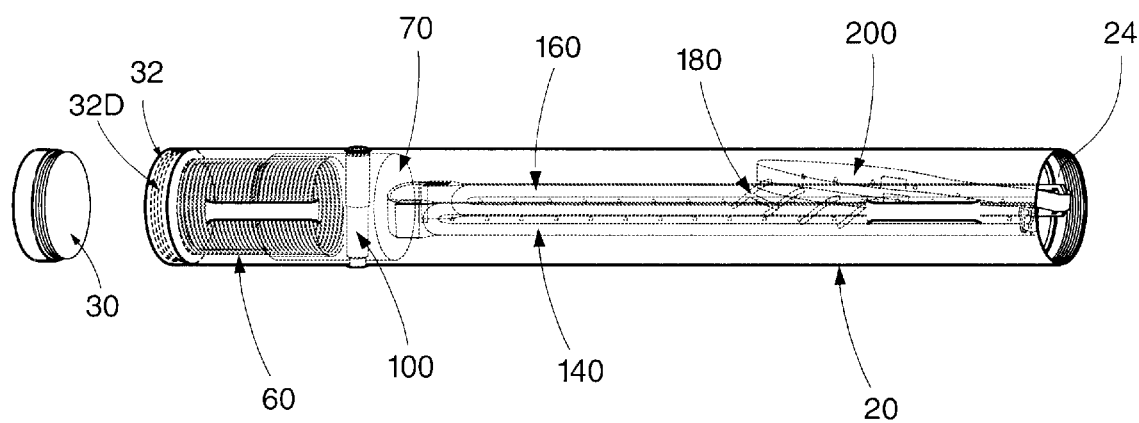
FIG. 4 is a perspective view of a self-deploying net according to a preferred embodiment of the present invention.

Housing 20 is preferably cylindrically shaped and formed from any suitable material such as, for exemplary purposes only, stainless steel or plastic. Preferably, housing 20 generally has an outer surface 22, an inner surface 24, a first open end 26, a second open end 28, a first end-cover 30 and a second end-cover 32, as best seen in FIG. 3. Outer surface 22 of housing 20 preferably has loops 22A, 22B, 22C and 22D defined thereon, wherein loops 22A, 22B, 22C and 22D are preferably integrally formed to outer surface 22 or attached thereto via any attaching means known within the art, such as, for exemplary purposes only, epoxy or resin. Loops 22A, 22B, 22C and 22D are preferably generally elongated, substantially rectangular shaped and are preferably elevated from outer surface 22. Loops 22A, 22B, 22C and 22D are preferably dimensioned to receive an adjustable shoulder strap 35 for the carrying of device 10. Although loops 22A, 22B, 22C and 22D are preferably formed from metal material, it is contemplated in alternate embodiments that loops 22A, 22B, 22C and 22D could be formed from other materials, such as, for exemplary purposes only, plastic or fabric. Furthermore, although adjustable shoulder strap 35 is preferably formed from a nylon material, such as, for exemplary purposes only, nylon webbing, other suitable material could be used.

A threaded interface 24A is formed preferably on inner surface 24 of housing 20 and proximal to first open end 26, wherein threaded interface 24A preferably corresponds with and is dimensioned to receive a threaded engagement 30B of first end-cover 30. First end-cover 30 further preferably has a cap 30A attached to threaded engagement 30B, wherein cap 30A preferably has a centrally positioned drain throughhole 30C formed therethrough, extending through the length of threaded engagement 30B to enable draining of water collected within housing 20 should device 10 be submersed in water.

Similarly, a threaded interface 24B is formed preferably on inner surface 24 and proximal to second open end 28. Second end-cover 32 preferably has a cap 32A, a threaded engagement 32B attached to cap 32A, and an air cell 32C attached to threaded engagement 32B. Threaded interface 24B preferably receives threaded engagement 32B, whereupon threaded connection of threaded interface 24B and threaded engagement 32B results in complete recession of air cell 32C into housing 20. Air cell 32C is preferably cylindrically shaped and chamber-like, encasing dead air to enable floatation or buoyancy of device 10 should device 10 be exposed to a body of water.

Cap 32A preferably has an outer threaded interface 32D formed thereon, generally opposite threaded engagement 32B, wherein threaded interface 32D is dimensioned to receive and retain threaded engagement 30B of first end-cover 30, thus preventing loss of first end-cover 30 upon removal from first open end 26 of housing 20. End-covers 30 and 32, and specifically threaded engagements 30B and 32B, respectively thereof, are preferably cylindrically shaped, thereby facilitating secured engagement of threaded engagements 30B and 32B with threaded interfaces 24A and 24B, respectively.

Tension spring 60 is preferably a coil-spring having an uncompressed or extended length enabling full retention of tension spring 60 within housing 20. A first end 62 of tension spring 60 preferably sits over and around air cell 32C and on threaded engagement 32B of first end-cover 32. A second end 64 of tension spring 60 is preferably secured within a recessed end 72 of plunger 70, wherein generally complete compression of tension spring 60 results in the positioning of tension spring 60 substantially within recessed end 72 of plunger 70. Although it is preferred that tension spring 60 be formed from a metal material, it is contemplated in an alternate embodiment that tension spring 60 could be formed from other suitable materials such as, for exemplary purposes only, plastic.

Plunger 70 is preferably generally cylindrically shaped and is preferably of a diameter defined to enable positioning of plunger 70 within housing 20 and to facilitate movement of plunger 70 therein and therethrough. Plunger 70 is preferably formed from plastic material, although other materials may be used, such as, for exemplary purposes only, metal. Specifically, plunger 70 preferably possesses a solid, substantially closed end 74 attached to recessed end 72, wherein a throughhole 76 is formed through the diameter of closed end 74 for insertion of locking mechanism 100 therein. Formed preferably along the length of plunger 70 and opposite one another are V-shaped channels 78 and 80, wherein V-shaped channels 78 and 80 are preferably dimensioned to slidably engage inverted V-shaped ridges 34 and 36, respectively, formed preferably on inner surface 24 of housing 20. Engagement of channels 78 and 80 with ridges 34 and 36 preferably prohibits rotation of plunger 70 within housing 20, particularly when plunger 70 is springfully urged through the length of housing 20 by extension of tension spring 60. A raised stop 38 formed preferably on inner surface 24 and just below threaded interface 24A, encircles the inner circumference of housing 20 and preferably prohibits plunger 70 from fully exiting first open end 26 of housing 20 following extension of tension spring 60.

Locking mechanism 100 preferably includes a release button 102 slidably joined to a reduced-diameter safety button 104, wherein joining of release button 102 and safety button 104 preferably forms the preferred hollow, generally cylindrical shape of locking mechanism 100. Positioned substantially within the hollow interior of locking mechanism 100 is spring 106, wherein spring 106 enables resilient depression of release button 102 and safety button 104. Locking mechanism 100 preferably extends from throughhole 76 of plunger 70, wherein ends 102A and 104A of release button 102 and safety button 104, respectively, are partially exposed and receivable within opposing throughholes 40 and 42, respectively, formed in housing 20, proximal second open end 28.

Preferably, button caps 44 and 46 are positioned over throughholes 40 and 42, respectively, wherein button caps 44 and 46 contact protruding ends 102A and 104A, respectively, Button caps 44 and 46 are preferably formed from rubber, although other materials can be used, such as, for exemplary purposes only foam rubber, plastic or metal. Tension spring 60 is preferably held in a compressed state by plunger 70 via protrusion of ends 102A and 104A of locking mechanism 100 from throughholes 40 and 42, respectively, of housing 20. Depression of button caps 44 and 46 preferably engages release button 102 and safety button 104, wherein plunger 70 is released and springfully urged through the length of housing 20, guided therethrough via the interaction of channels 78 and 80 of plunger 70 with ridges 34 and 36 of housing 20, respectively. Safety button 104 is incorporated for the specific purpose of preventing accidental deployment of device 10

Surface 86 of closed end 74 of plunger 70, opposite recessed end 72, carries an air passageway 92 formed thereon, wherein air passageway 92 functions to reduce the vacuum effect caused by ascension of plunger 70 through housing 20. Curved spring 120 is attached to surface 86, proximate to air passageway 92, wherein preferably bolts 50 and 52 extend through throughholes 122 and 124 of curved spring 120 and thereafter through throughholes 88 and 90 formed on surface 86 of plunger 70. Curved spring 120 is preferably a resiliently curved piece of metal having a first receiving end 126 and a second receiving end 128, wherein first and second receiving ends 126 and 128, respectively, are dimensioned to fit within clasps 142 and 162, respectively, of support arms 140 and 160, respectively.

Figure 5:
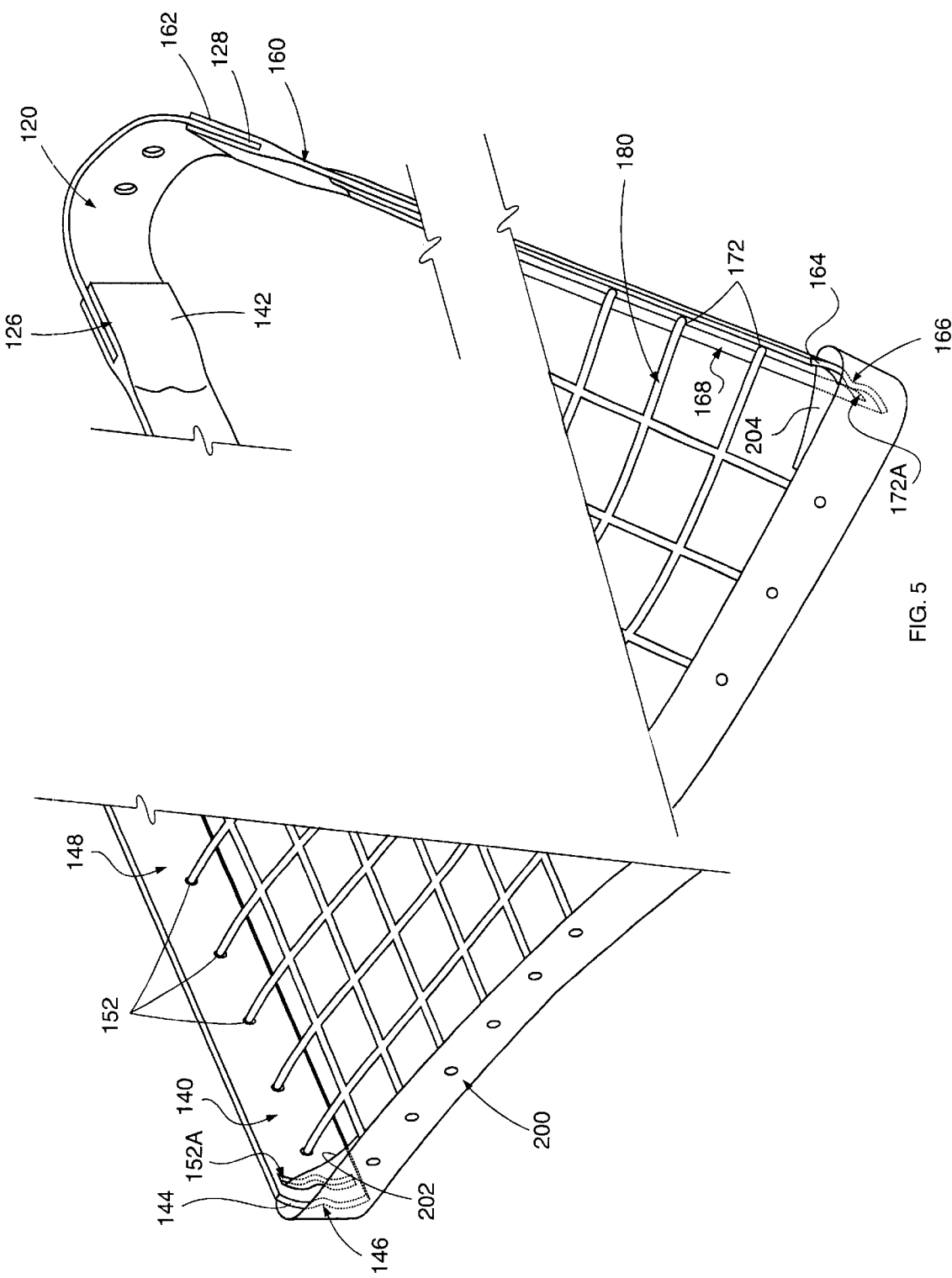
FIG. 5 is a perspective view of the support arms of a self-deploying net according to a preferred embodiment of the present invention.

As best seen in FIG. 5, support arms 14C and 160 are preferably elongated, rectangular shaped and formed from any suitable material, such as, for exemplary purposes only, stainless steel or plastic. Support arms 140 and 160 are preferably generally crescent-shaped so as to conform to the cylindrical shape of housing 20 when recessed therein. Support arm 140 preferably comprises distal end 144 opposite clasp end 142, wherein clasp end 142 is preferably a slotted, dual-fingered clasp dimensioned to receive first end 126 of curved spring 120. Similarly, support arm 160 preferably comprises distal end 164 opposite clasp end 162, wherein clasp end 162 is preferably a slotted, dual-fingered clasp dimensioned to receive second end 128 of curved spring 120. Ends 126 and 128 of curved spring are secured to clasp ends 142 and 162, respectively, via any suitable securing means, such as, for exemplary purposes only, epoxies, resins, rivets, bolts or may be integrally formed thereto. Furthermore, curved spring 120 and support arms 140 and 160 could be molded as a single unit from resilient metal, plastic or other suitable resilient material. When support arms 140 and 160 are extended from housing 20, curved spring 120 springfully urges open support arms 140 and 160 into a V-formation.

A channel 146 is defined on side 150 of support arm 140, opposite a side 148, wherein side 150 is generally in contact with inner surface 24 of housing 20 when support arm 140 is recessed therein. Similarly, a channel 166 is defined on side 170 of support arm 160, opposite a side 168, wherein side 170 is generally in contact with inner surface 24 of housing 20 when support arm 160 is recessed therein. Channels 146 and 166 preferably possess a plurality of throughholes 152 and 172, respectively, wherein net 180 is preferably weaved or knotted therethrough. Channels 146 and 166 preferably function to prohibit frictional rubbing of the weaved ends of net 180 against inner surface 24 of housing 20 when support arms 140 and 160 are springfully ejected from first open end 26 via attached curved spring 120, plunger 70 and tension spring 60. Furthermore, engagement of channels 78 and 80 of plunger 70 with ridges 34 and 36 of housing 20, respectively, prevent rotation of plunger 70 and attached supports arms 140 and 160 within housing 20. Moreover, when device 10 is in the non-deployed position and support arms 140 and 160 are recessed within housing 20, distal ends 144 and 164 of support arms 140 and 160, respectively, rest over and above raised stop 38, thus avoiding hindrance therefrom upon deployment from housing 20.

Distal ends 144 and 164 of support arms 140 and 160, respectively, preferably possess slots 152A and 172A, respectively, dimensioned to receive and have attached thereto ends 202 and 204, respectively, of flexible net strap 200, wherein net strap 200 is preferably formed from a nylon material and functions to aid in the support of net 180. Specifically, net strap 200 is preferably nylon webbing; however, other durable, malleable material could be used. A first portion 206 of a hook-and-loop fastener is preferably positioned at end 202 and a second portion 208 of a hook-and-loop fastener is preferably positioned at end 204, wherein attachment of first and second portions 206 and 208, respectively, prohibits net 180 from exiting first end 26 of housing 20 when first end-cover 30 is removed and device 10 is jostled around. Upon deploying device 10, first and second portions 206 and 208, respectively, unhook in response to the deployed tension of curved spring 120 forcefully pushing support arms 140 and 160 apart.

Net 180 is preferably a mesh nylon net woven or knotted through plurality of throughholes 152 and 172 of support arms 140 and 160, respectively. Net 180 is preferably attached to net strap 200 via any attachment means, such as, for exemplary purposes only, stitching, weaving, knotting or adhesives.

In an alternate embodiment, housing 20, plunger 70 and support arms 140 and 160 could define a different shape such as, for exemplary purposes only, housing 20 could possess a rectangular-tube-shape, wherein plunger 70 could also possess a rectangular-tube-shape to facilitate upward movement through housing 20, and wherein support arms 140 and 160 could also possess a rectangular-tube-shape to facilitate the housing and/or movement of support arms 140 and 160 within housing 20.

In an alternate embodiment, device 10 in general could be made of any suitable material such as, for exemplary purposes only, plastic.

In an alternate embodiment, device 10 could include a mechanism to enable deployment via the incorporation and depression of only one button.

In an alternate embodiment, plunger 70 could be a generally solid block in communication with tension spring 60.

In an alternate embodiment, first end-cover 30 could possess a wire or string connected to housing 20, such that upon removal of first end-cover 30 from first open end 26, first end-cover 30 would remain connected to housing 20, thus avoiding its loss.

In an alternate embodiment, device 10 could contain more than one drain throughhole.

In an alternate embodiment, plunger 70 could have more than one air hole.

In an alternate embodiment, air cell 32C could be positioned elsewhere on or in device 10.

In an alternate embodiment, device 10 could contain more than one air cell.

In an alternate embodiment, plunger 70 could have more than two channels and/or inner surface 24 could have more than two ridges.

In use, device 10 is in a deployable position when plunger 70 is positioned proximal second end-cover 32 and secured in place via extension of ends 102A and 104A of release button 102 and safety button 104, respectively, through throughholes 40 and 42, respectively, of housing 20. Removal of first cap 30 will allow expulsion of support arms 140 and 160 through first end 26 of housing 20. Simultaneous depression of button caps 44 and 46 contact ends 102A and 104A of release button 102 and safety button 104, respectively, unlocking plunger 70 from its position. Spring force of compressed tension spring 60 against recessed end 72 of plunger 70 forcefully urges plunger 70 through housing 20, thereby pushing attached support arms 140 and 160 upward and out of first open end 26 of housing 20. Full extension of support arms 140 and 160 into a V-formation via curved spring 120 is achieved upon the halting contact of plunger 70 with raised stop 38 of inner surface 24. Upon extension of support arms 140 and 160, flexible net strap 200 becomes tensioned, and net 180 opens up into a V-shaped or triangular formation. To return device 10 to a non-deployed condition, support arms 140 and 160 are brought together and pushed back into housing 20, wherein re-extension of ends 102A and 104A of release button 102 and safety button 104, respectively, back through throughholes 40 and 42, respectively, return device 10 to a secured and non-deployed state.

Having thus described exemplary embodiments of the present invention, it should be noted by those skilled in the art that the within disclosures are exemplary only, and that various other alternatives, adaptation, and modifications may be made within the scope of the present invention. Accordingly, the present invention is not limited to the specific embodiments illustrated herein, but is limited only by the following claims.

What is claimed is:

1. A self-deploying net, comprising:
   a housing, said housing being substantially hollow and said housing having an inner surface and an outer surface;
   a shuttle carried substantially within said housing and slidably positioned proximate to said inner surface of said housing, said shuttle having a first end and a second end;
   at least one first spring carried by said first end of said shuttle;
   at least one curved spring carried by said second end of said shuttle;
   a first support arm carried within said housing by said at least one curved spring;
   a second support arm carried within said housing by said at least one curved spring;
   a net carried by said first and second support arms; and
   at least one deployment means carried by said shuttle.

2. The self-deploying net of claim 1, wherein said housing is substantially cylindrical shaped and defines a first aperture, said first aperture dimensioned to receive a first cap, said first cap having at least one drain hole defined therethrough, and wherein said housing defines a second aperture, said second aperture dimensioned to receive a second cap, said second cap carrying at least one air cell, and said second cap removably receiving said first cap.

3. The self-deploying net of claim 2, wherein said housing further comprises at least one ridge formed on said inner surface, said at least one ridge engageable with at least one channel formed on an exterior of said shuttle, wherein engagement of said at least one ridge with said at least one channel inhibits rotational movement of said shuttle within said housing, wherein said shuttle and said housing are generally cylindrical shaped.

4. The self-deploying net of claim 2, wherein said shuttle is springfully urged through the general length of said housing via spring force from said at least one first spring, wherein said at least one first spring is a coil spring, and wherein a stop formation is positioned proximate to said first aperture of said hosing, thereby preventing said shuttle from fully ejecting from said housing.

5. The self-deploying net of claim 2, wherein said at least one curved spring carried by said second end of said shuttle comprises at least two connecting ends, wherein said first and second support arms are carried by said at least two connecting ends facilitating springful extension of said first and second support arms upon exit from said first aperture.

6. The self-deploying net of claim 5, wherein said first and second support arms each have at least one channel defined therein, said at least one channel having a plurality of throughholes defined therein, wherein said plurality of throughholes carry said net, and wherein said at least one channel of each said first and second support arm prevents frictional contact between said net and said housing.

7. The self-deploying net of claim 6, wherein the distal ends of said first and second support arms carry a flexible net retainer, wherein said flexible net retainer limits the divergence of said first and second support arms during deployment thereof, and wherein said net is carried by said first and second support arms and said flexible net retainer.

8. The self-deploying net of claim 7, wherein said flexible net retainer is a strap, said strap having hook-and-loop fasteners enabling generally secure retention of said net within said housing.

9. The self-deploying net of claim 1, wherein said housing carries at least one strap proximal to said outer surface.

10. The self-deploying net of claim 1, wherein said at least one deployment means is a first and second button springfully coupled to one another, said first and second buttons carried within a throughhole formed on said shuttle, and wherein said first and second buttons extend through a first and second throughhole, respectively, of said housing to maintain said shuttle and said at least one first spring in a non-deployed position.

11. An automatically assembling receptacle, comprising:
   an encasement, said encasement having an interior surface and an exterior surface;
   a transport glidably carried within said encasement, wherein said transport comprises a first end and a second end, and wherein said transport comprises at least one canal formed on an exterior surface of said transport;
   at least one first resilient mechanism carried by said first end of said transport;
   at least one bowed resilient mechanism carried by said second end of said transport;
   a first and second elongated member carried by said at least one bowed resilient mechanism and carried within said encasement;

a receptacle carried by said first and second elongated members; and at least one assembly initiator carried by said transport.

12. The automatically assembling receptacle of claim 11, wherein said encasement is cylindrical and comprises a first and second opening, said first and second openings opposingly positioned from one another and capable of receiving a first and second cover, respectively, said second cover having at least one air chamber carried thereby and said first cover having at least one fluid escape hatch formed thereon, said first cover being threadably engagable with said second cover.

13. The automatically assembling receptacle of claim 12, wherein said encasement further comprises at least one crest formed on said interior surface, said at least one crest engageable with said at least one canal formed on said exterior surface of said transport, wherein engagement of said at least one crest with said at least one canal prevents rotational movement of said transport within said encasement, said transport having a substantially cylindrical shaped.

14. The automatically assembling receptacle of claim 12, wherein said transport is resiliently pushed along the central axis of said encasement via resilient force from said at least one first resilient mechanism, wherein said at least one first resilient mechanism is a coil spring, and wherein said transport is prevented from fully ejecting from said encasement via at least one guard formed proximal to said first opening.

15. The automatically assembling receptacle of claim 12, wherein said at least one bowed resilient mechanism carried by said second end of said transport comprises at least two attaching ends, wherein said attaching ends are attached to said first and second elongated members to allow the resilient extension and positioning of said first and second elongated members upon urged exit from said encasement.

16. The automatically assembling receptacle of claim 15, wherein said first and second elongated members each have at least one inset formed thereon, each said at least one inset having a plurality of throughholes formed thereon, wherein said plurality of throughholes carry a plurality of ends of said receptacle and wherein said at least one inset prevents frictional rubbing of said plurality of ends of said receptacle with said interior surface of said encasement.

17. The automatically assembling receptacle of claim 16, wherein the distal ends of said first and second elongated members carry a band, said band influencing the relative position of said first and second elongated members, wherein said band and said first and second elongated members carry said receptacle.

18. The automatically assembling receptacle of claim 17, wherein said band carries hook-and-loop fasteners enabling retention of said receptacle within said encasement.

19. The automatically assembling receptacle of claim 11, wherein said encasement further carries an adjustable shoulder strap carried by said exterior surface.

20. The automatically assembling receptacle of claim 11, wherein said at least one assembly initiator is a first and second switch resiliently coupled to one another, said first and second switches positioned within said transport, and said first and second switches at least partially extending through said encasement proximal to said second opening.

21. A method of quickly seizing a catch, comprising the steps of:
 a. obtaining a self-deploying net, said self-deploying net, comprising:
  a housing, said housing being substantially hollow and said housing having an inner surface and an outer surface;
  a shuttle carried substantially within said housing and slidably positioned proximate to said inner surface of said housing, said shuttle having a first end and a second end;
  at least one first spring carried by said first end of said shuttle;
  at least one curved spring carried by said second end of said shuttle;
  a first support arm carried within said housing by said at least one curved spring;
  a second support arm carried within said housing by said at least one curved spring;
  a net carried by said first and second support arms; and
  at least one deployment mechanism carried by said shuttle; and
 b. removing a first cap from said self-deploying net;
 c. initiating said deployment mechanism carried by said shuttle to springfully deploy a net supported by support arms from out a housing of said self-deploying net out; and
 d. utilizing said net to maintain the catch.

* * * * *